Jan. 14, 1947.    D. GARDNER    2,414,294
PRODUCTION OF PURE TELLURIUM
Filed Jan. 21, 1943
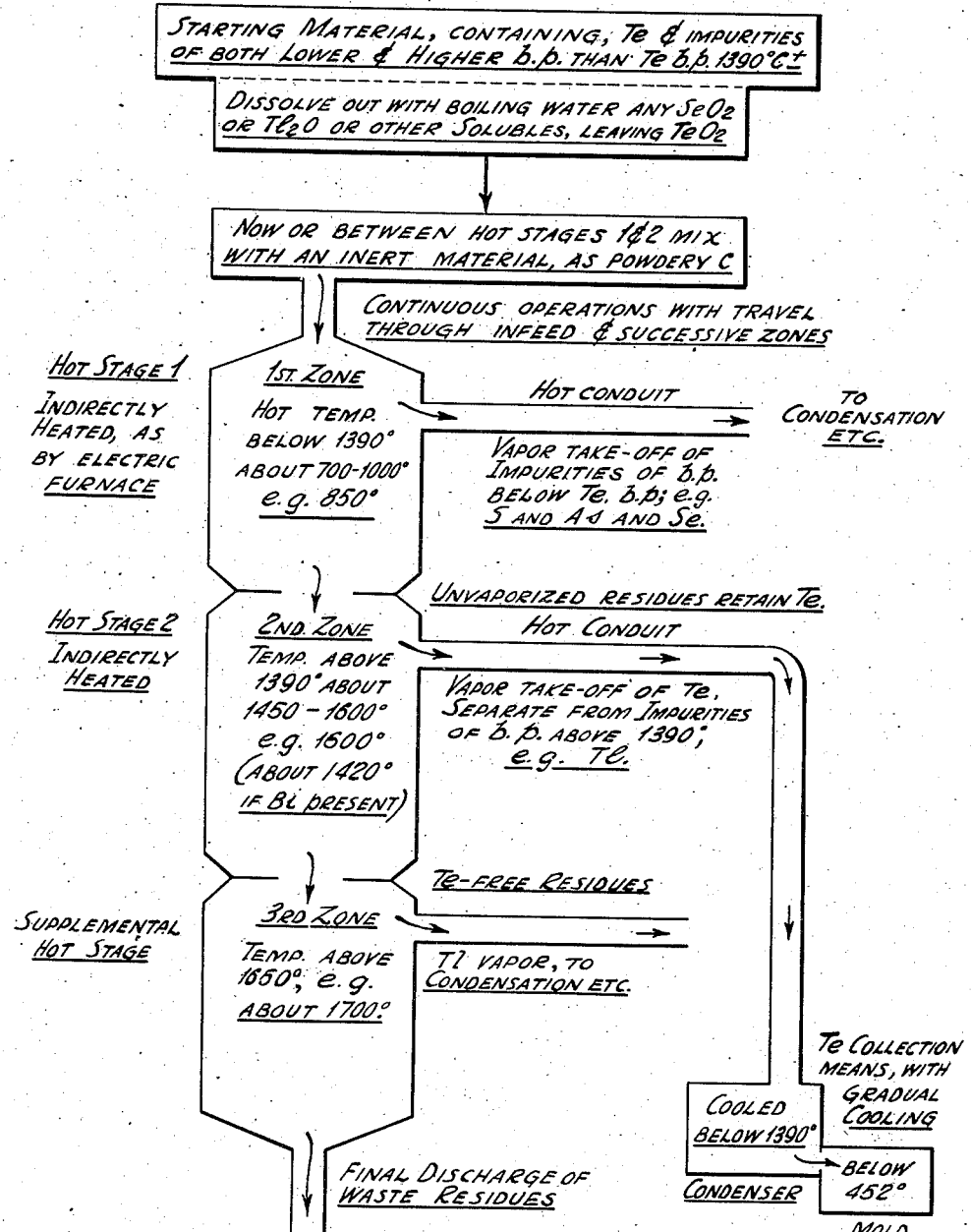
INVENTOR:
DANIEL GARDNER
BY
Morrison, Kennedy &
Campbell, ATTORNEYS.

Patented Jan. 14, 1947

2,414,294

UNITED STATES PATENT OFFICE 2,414,294

PRODUCTION OF PURE TELLURIUM

Daniel Gardner, New York, N. Y.

Application January 21, 1943, Serial No. 473,115

12 Claims. (Cl. 23—209)

This invention relates to the production of pure tellurium and comprises particularly a process for treating impure or commercial tellurium or the source thereof to convert it to the highly pure element, by steps of separation or elimination and isolation.

Commercial tellurium may contain impurities of various sorts, and in varying amounts from about 2 percent up to much higher percentages, and it is believed that the maximum purity heretofore obtainable in a practical sense has been not over 99 percent, and this only by unsatisfactory methods including chemical steps in series, involving numerous solutions and manipulations, high cost and unreliability of result. By the present invention it is possible to obtain in a practical and industrial sense the element tellurium in solid form of substantially chemical purity, at least of the order of 99.90 percent and even up to about 99.98 percent. The differences between 98 to 99 percent on the one hand and on the other hand 99.9 percent or higher, constitutes a very critical and important difference, especially in relation to certain practical or industrial functions and uses of the material.

Such uses of tellurium include electrical insulation or dielectric uses, the element being a good non-conductor and, when chemically pure without metallic content, of such high resistivity as to be a superlative insulator, better for many insulating and dielectric uses than any known insulators, such as mica. Tellurium it is believed is substantially the only element known which is a substantially perfect electric insulator in elemental condition. It is therefore useful in its pure form for the making of various electric insulating or dielectric parts of apparatus; and it forms a good heat insulation as well; and other utilities will be referred to hereinbelow.

It is well known in respect to the insulating and certain other uses of tellurium that the arts have suffered from the lack of adequate purity of the available substance; and this need has long presented a problem the solution of which by an industrially practical system is the general and main object of the present invention. A further object is to avoid the elaborate character and other drawbacks of chemical treatments to produce purified tellurium. Other and specific objects, advantages and uses will be explained in the hereinafter following description of one or more illustrative embodiments of the invention or will be understood by those conversant with the subject. To the attainment of such objects and advantages the present invention consists in the novel process for the production of pure tellurium, or the purification of the commercial substance, and the novel features of step and product and uses thereof, as hereinafter described and claimed.

Tellurium and the related elements sulfur and selenium in periodic Group VI are non-metals or metalloids; and tellurium appears in several allotropic forms, having 2 atoms in the molecule, unlike selenium and sulfur, which have 8; and having valances of 2 or 4 or 6 as with selenium. It has a melting point of about 452° and boiling point of about 1390°; these temperatures being very considerably higher than the corresponding temperatures for selenium. Throughout this specification centigrade temperatures are employed.

Among relevant data are the following. Like selenium, tellurium does not combine directly with carbon or silicon, nor does it react directly with nitrogen, nor with carbon dioxide, and it is indifferent also to chromium. Despite these similarities, the problem of isolating pure tellurium differs extensively from that of purifying selenium, due to the much higher temperatures involved and other factors necessitating special conditions and precautions in the purifying treatments. Another relevant factor is that tellurium is unable to form tellurium oxychloride.

Among the various sources of tellurium are ores, in which it appears usually in the form of tellurides; but its particular commercial sources comprise residues or byproduct materials. As an example the element is usually contained in substantial proportions in the anodic sludge, slime or residue from electrolytic systems of refining copper, nickel, cobalt and certain other metals; such slimes usually containing also selenium and thallium. Another source is from flue dust resulting from the smelting or treatment of pyrites in sulfuric acid manufacture; in known systems telluric acid being first recovered chemically and then reduced to the element tellurium, with steps to bring about as well as possible the separation of the element from selenium and thallium. By these or other known methods commercial tellurium has been produced; but the problem of obtaining high purity has involved such practical difficulties in isolating the element, that superior resistivity has not been practically secured, and thus wide uses of the element have been prevented.

The difficult problem of obtaining the high-purity element is due to its property of high reactivity with other elements and compounds, including substantially all of the known elements. Among the notable impurities found in commercial tellurium are the following: sulfur (M. P. 112.8°; B. P. 444.8°), and from the sulfur group selenium (M. P. 217°; B. P. 688°); other impurities including the non-metal arsenic, and among the metals notably thallium (M. P. 303.5°; B. P. 1650°).

The present application is independent of but bears a certain relation to a copending application disclosing a process for the purification of selenium, this relation being due to certain similarities in properties and other factors between the two elements; although the respective inventions are independent due to important differences in properties and other factors, between selenium and tellurium, and to the different fields of use and functions of the respective elements. Owing to the fact that the starting materials frequently contain both of these elements, there is involved also the conception of the general process for the separation from each other of the two elements by steps involving also the isolating and recovering of each of them as a separate final product.

The general conditions and data being thus stated, the present invention may be first described as starting with commercial tellurium, which is rather plentiful on the market and has considerable use in ceramics but which, for the insulating and other technical uses already outlined, is too much impaired by impurities to serve with desirable efficiency. Of course, in practicing the present process, the complete system may commence if desired with the source or raw material, or some mixture, whether an ore or a residue; in which case the reduction thereof to commercial purity may to advantage be thereupon promptly and continuously followed, while still under heat, by the purification steps of the present invention. It is further to be understood that the impure tellurium is preferably supplied to the treatment in granular form, that is, crushed, ground or otherwise mechanically reduced to granular or powdery condition, thus facilitating the handling of the material and rendering more complete the reactions thereon; but if desired this starting material may be a compound or mixture in molten form.

The process of the present invention is based upon the discovery that the element tellurium can be purified and isolated without recourse to the chemical bath treatments already tried but on the principle of distillation, performed at high temperatures and in a particular manner, to afford the high-purity product desired; and the present invention is believed to be the first practical instance of high purification of tellurium by distillation, involving selective vaporization, recovery, condensation, and solidification of the pure element. In general, of course, distillation has been much used in the technical arts for obtaining purified materials, and for purifying metals, such as mercury, and other elements of low boiling point, as cadmium, arsenic, zinc, and many others; the vaporization temperatures depending upon the boiling points and on the impurities present, which also tend to cause brittleness and other objections. But in such cases the operation was practically simple; whereas with tellurium a difficult obstacle existed in its strong tendency to attack and combine with virtually all known materials, raising such acute problems and complications, in relation to various factors, including the reaction atmosphere, and the constitution of the necessary apparatus parts, chambers, etc., as to have practically barred the previous achievement of the results of the present invention, solving the problems mentioned, in the manner hereinafter disclosed. In the case of one particular raw material or ore, wherein tellurium has thallium combined with it, a special problem is found to arise in that thallium tends to vaporize and pass along with the tellurium at well below its own boiling point; which the present invention avoids.

High temperatures are thus involved in the present invention, requiring a suitable apparatus or furnace, wherein the reaction temperatures at all stages can be predetermined and adjusted in accordance with the steps of the process; and wherein combustion is not relied on as a source of heat, the objections of which are such as to render it impractical for the purposes in hand. A type of indirectly heated furnace apparatus useful for the purpose is the electric furnace, and a suitable example thereof is that shown in the Gardner Patent No. 2,195,453, granted April 2, 1940, reissued No. 22,274 on February 23, 1943. As will further appear it may be desirable, in the complete process, that two or more furnaces or furnace sections be employed, interconnected in tandem, so as to present successive chambers or zones wherein may be carried out successive stages or operations of the process; with separate vapor outlets from the several furnaces, sections or chambers to separate condensers.

Accompanying this specification, and forming part of this application, a flowsheet drawing is appended upon which have been laid out in conventional form diagrammatic representations and written inscriptions indicating the more important and characteristic stages, steps and other factors involved in the preferred embodiments of this invention.

With continuous production, the starting material may be commercial tellurium; or if it be a material containing also selenium it will be assumed to have been treated in a first stage, e. g., at between about 700° and 1000°, preferably about 850°, for the complete removal of the selenium; prior to the vaporization of which are removed also any arsenic content, as well as sulfur and any other constituents of boiling points below that of selenium. For the recovery of the tellurium content from the commercial substance, or from the first stage tailings, the material in a thoroughly dried condition is caused to travel progressively through the main treatment chamber toward a final point of discharge of molten or solid residues; while during such transit it is subjected to controlled high temperature and treatment as will be next described.

In any case the material will preferably have been previously intimately mixed with certain powdered inert substances to give it increased body. If powdered carbon is used it may have been premixed before the removal of selenium. The addition however may be to the tailings, after selenium vaporization; and in that case the carbon may be replaced by or combined with silicon, or carbon silicide or chromium or a combination thereof; but these additions are inadvisable if such impurities as arsenic or phosphorus are present.

Such a mixture of the inert substance, as carbon, and the material containing a goodly percentage of tellurium is now raised, in the main treatment chamber or reaction zone, to a temperature well above the vaporizing point 1391° of tellurium but well below 1650°, that of thallium, and preferably between about 1450° and about 1600°. The tellurium is thus completely vaporized and is taken off or passes over from the furnace through hot vapor conduits to a collection vessel or points of condensation and of solidification as pure tellurium. A desirable temperature is 1600° and by avoiding a temperature much above that the metal thallium, vaporizing only at 1650°, may be restrained and so eliminated as an impurity.

To promote the elimination of thallium, however, preliminary steps may be taken to this end. For example, if the starting material is in fine form, as flue dust, it may be treated with boiling water, by which thallous oxide Tl₂O is dissolved out, also selenous oxide SeO₂, whereas tellurous oxide TeO₂ is not so removable, requiring a concentrated acid to dissolve it. Tellurous oxide is more stable, and stable at higher temperatures, than the corresponding compounds of sulfur, and of selenium; however in aqueous solutions selenium can reduce tellurous oxide to tellurium at all concentrations. By whatever steps the thallium content is removed, this metal is subject to subsequent recovery from the residue, which may be accomplished by suitable heat treatments.

If a tellurium ore should contain some bismuth (B. P. 1470°), as sometimes happens, the vaporizing of the tellurium should be below 1470°, as between 1400° and 1440°, or about 1420°, to leave behind the bismuth with any thallium present.

The vaporized tellurium may now be flowed along from the furnace to the condenser chamber, e. g., through a passage, flue, or conduit such as that marked 6 in said patent, which however should be exteriorly heated to preclude premature condensation. Gradual cooling to below the boiling point 1390° causes condensation; following which the molten tellurium is flowed by a warmed extension conduit to a warmed solidifying chamber or mold, wherein also the cooling should be gradual, to below the melting point 452°, yielding a solid ingot of the pure element. Preferably there is maintained a set of condensing chambers, which are filled and emptied in rotation, these delivering to a set of separate molds, selectively fed, thus avoiding interruption of the continuous process.

The furnace heating means must be controllable as to temperature, e. g., as in the manner described in said patent; and in general the vaporizing temperature should be kept even, with a steady gradient through the system, to below 1390° at the condensers and below 452° at the molds.

The distillation process thus generally described would not be of practical value in an industrial sense without certain further provisions, as will next be described, relating to the special atmosphere that must be maintained within the apparatus; and to the special refractory character of the apparatus parts, walls, linings, flues, chambers and conduits, of nonreactive composition in relation to the solid, liquid and vaporous materials to be handled; and as well as to the prevention of leakage of air, gases or vapors into or from the system, requiring provisions to seal tightly all joints.

Thus, the atmosphere must be free of components tending to contaminate the pure tellurium vapors passing toward the condenser and mold. All traces must be excluded or removed of air, moisture, hydrogen, and sulfurous gases, as sulfuretted hydrogen, and similar compounds of selenium and tellurium. In other words the atmosphere must be passive to the tellurium vapors, and may be an inert gas such as argon, or helium, either of which may be recirculated. Or it may be pure nitrogen gas; or of carbon dioxide, the latter being stable against decomposition up to 1600°, becoming not more than 0.1 percent decomposed at atmospheric pressure, which is preferred.

The argon, or other atmosphere, may be first flowed through the apparatus to scavenge all air, moisture, etc., and then maintained as a steady current during operation. It may be supplied through the infeed 5 of the Gardner patent, with the dry tellurium material, but preferably is blown in to excess near the discharge end of the furnace, as by the pipe 6ª entering the lower end of the furnace vapor flue F, thus by its pressure and flow acting to exclude undesired gaseous agents tending to enter by the top-end inlet. A further desirable step is to flow the vapors from the furnace through a filter trap adapted to absorb impurities before reaching the condenser; for example a collection of porous absorptive blocks of pure carbon, renewed occasionally.

Another provision of importance is to provide furnace and conduit parts and walls, or their linings, of substances that are passive and lack any tendency to contaminate the vaporized tellurium; this applying to all interiorly exposed parts including the screw feeder member 4 of the furnace of said patent, and all parts to the condenser and mold. The number of refractory substances immune to attack by tellurium vapors is limited, including principally graphite, petroleum coke and other carbons of purity; which resist the formation of tellurides and do not introduce impurities into the current. Among other substances are silicon, carbon silicide, and the carbides of zirconium, tantalum or chromium; and pure tellurium itself is an excellent substance for parts or coatings, as the receiving molds, not subject to temperatures above 1000°, being also an effective heat insulator.

Also, the various apparatus walls should be impermeable, and they and the joints impervious to leakage and infiltration of disturbing gases. A special coating or sealing compound may be used, applicable to joints and surfaces. Powdered chromium oxide is intimately mixed with powdered graphite, to which petroleum pitch is added; and this composition when applied should be subjected to progressive heat-treatment to minimize peeling. No formation of chromium telluride results, but an effective layer of protective chromium carbide is formed, with the high melting point of about 1900°, therefore adequately refractory.

The receiving molds also are preferably protected, by a thin layer as of chromium carbide, or of other carbides, not attacked by molten tellurium, as of zirconium or tantalum; and the inert atmosphere is flowed from the condensers through the molds; so that, after slow cooling, compact pigs of tellurium result.

The elemental tellurium product on analysis may show a high purity closely approaching 100 percent. It can be remelted for casting to any desired shape, for insulation or refractory purposes, provided that protection against contamination is ensured during the operation by means of the passive atmosphere and inert composition of the remelting and casting apparatus. Incidentally the determination of the melting point of the material is a good criterion of its purity, enabling intelligent control of the process.

The process residues, if containing thallium, may be passed along by the furnace discharge to further steps to recover the thallium, for example to a succeeding furnace, with temperature of about 1700° to vaporize and deliver the thallium content for condensation and molding.

Practical uses of pure tellurium

Tellurium may be cast or otherwise shaped to constitute blocks, walls, layers, posts or various other parts of apparatus for various industrial or scientific purposes, as to utilize the high electrical resistivity of the element, as an insulator or dielectric member, coating, support or other part. Or, mechanical parts of high thermal insulative property as well as refractoriness may be usefully afforded.

Having the highly-pure element it is possible to produce by chemical steps high grade tellurides, useful for various purposes. Generally the tellurides have higher melting points than their constituent elements and therefore afford effective refractory walls or other parts. In the subject of radio detectors or rectifiers of the crystal type study has shown that certain tellurium compounds are of functional value, such as silver telluride $Ag_2Te$ or gold telluride $AuTe_2$ or mercury telluride $HgTe$, and indeed use has been made of natural minerals corresponding thereto for such and analogous purposes.

In addition to these recited technical uses of tellurium, wherein its high purity is a factor, are other potential uses. One of these is the use as a catalyst of tellurium or certain compounds of it, for controlling various reactions, as for example to promote oxidation, especially under alkaline conditions. Thus in a copending application is disclosed the oxidation of certain hydrocarbons, to promote which were employed the element tellurium as a catalyst, or compounds of it, especially tellurides, for example of silver, tin or thallium, or mixtures of these with each other, or with certain oxides such as silver oxide.

Of these, silver telluride $Ag_2Te$, a generally useful compound, is a particularly powerful catalyst, especially if prepared as follows: The pure tellurium vapor, for example coming from the process furnace already described, is delivered into a condensing chamber wherein is maintained a pool of molten silver of high purity; the contact being by bubbling of the vapor or showering of the liquid. Silver telluride of high purity results from the reaction, with a melting point of about 955° and density of 8.5. Among other useful tellurides, cadmium telluride CaTe may be produced in the opposite manner, by distilling cadmium, vaporizing at about 767°, and passing it into a condenser containing molten pure tellurium, for reacting contact therewith; the product being a translucent red substance with melting point of about 1041° and density of 6.2. Zinc telluride $ZnTe$ may be similarly produced, with melting point of about 1238.5° and density of 6.34.

Tellurium, in addition to the properties hereinabove mentioned, possesses responsiveness to impingement of light rays, of less degree than in the case of selenium, but sufficient to alter its effects upon electric currents, by change of resistance or otherwise; and the element in a highly pure state may thus have certain utility in that additional field.

This application constitutes a companion case to applicant's copending application No. 473,116, for purification of selenium.

I claim:

1. The continuous process of producing substantially pure tellurium from impure tellurium-containing material containing impurities of lower boiling point than tellurium and impurities of higher boiling point than tellurium, comprising causing the impure tellurium-containing material to travel through an indirectly heated furnace having successive interconnected zones wherein the impure tellurium-containing material is subjected to selective distillation, first introducing the said material into the first of said successive zones and maintaining the temperature within the said zone below the boiling point of tellurium, but sufficient to vaporize the lower boiling point impurities, conducting the vaporized impurities away from the first zone, conducting the unvaporized tellurium-containing material into the succeeding zone, maintaining in said succeeding zone a temperature at which tellurium vaporizes, but below that at which the higher boiling point impurities are vaporized, conducting the tellurium vapor away from the unvaporized residue contained in said zone to a condenser maintained at a temperature at which tellurium condenses, but above that at which solidification takes place, and finally conducting the condensed tellurium to a mold to solidify the tellurium.

2. The process as in claim 1 wherein the unvaporized residue containing thallium is conducted from the zone in which tellurium is vaporized to a succeeding zone, heating the residue in said succeeding zone to a temperature at which thallium vaporizes, conducting the vaporized thallium to a condenser to condense the thallium, and finally solidifying the condensed thallium.

3. The continuous process of producing substantially pure tellurium from impure tellurium-containing starting material containing impurities of lower boiling point than tellurium and impurities of higher boiling point than tellurium, comprising causing such impure starting material to travel progressively through an indirectly heated furnace having successive interconnected zones wherein said material is subjected to successive vaporizations, namely, first feeding the said starting material into the first of said successive zones and maintaining the temperature within said first zone below the boiling point of tellurium, but sufficiently high to vaporize the impurities of lower boiling point, conducting the vaporized impurities away from the first zone, conducting the residual unvaporized tellurium-containing material into the second of such zones, maintaining in said second zone a temperature at which tellurium vaporizes, but below that at which the higher boiling point impurities are vaporized, conducting the tellurium vapor away from the unvaporized residue contained in said zone to a collecting means comprising a condenser maintained at a temperature at which tellurium condenses, and finally cooling for solidifying the condensed pure tellurium.

4. The process as in claim 3 wherein the impure tellurium-containing starting material contains also thallium and wherein the unvaporized residue containing thallium is conducted from the zone in which tellurium is vaporized to a succeeding third zone, heating the residue in said third zone to a maintained higher temperature at which thallium vaporizes, conducting the vaporized thallium to a condenser and therein condensing the thallium, and finally solidifying the condensed thallium.

5. The process as in claim 3 and wherein the impure tellurium-containing starting material is in granular form in mixture with a granular pure carbon material.

6. The process as in claim 3 and wherein the impure tellurium-containing starting material is introduced in pre-molten form.

7. The process as in claim 3 and wherein the tellurium vapor is treated supplementally by passage through a filter trap of bodies of pure absorbent carbon.

8. The process as in claim 3 and wherein prior to infeed the impure tellurium-containing material is treated with boiling water to dissolve out any thallium oxide without dissolving tellurium oxide.

9. The process as in claim 3 and wherein the tellurium-containing material contains among its impurities selenium of lower boiling point than tellurium.

10. The process as in claim 3 and wherein the tellurium-containing material contains among its impurities of lower boiling point than tellurium one or more of the elements of the group consisting of sulphur and arsenic.

11. The process as in claim 3 and wherein the tellurium-containing material contains among its impurities of higher boiling point than tellurium the element thallium.

12. The continuous process of producing substantially pure tellurium from impure tellurium-containing starting material containing impurities of lower boiling point than tellurium and impurities of higher boiling point than tellurium, comprising causing such impure starting material to travel progressively through the successive tandem connected zones or chambers of a high-temperature electric furnace the elements of which become heated to incandescence by the passage of the current, under control as to temperatures within the respective zones, the developed heat being transmitted through the zone walls to the materials traveling progressively therewithin, whereby said material is subjected to vaporizations at progressively rising temperatures in the successive zones, including first feeding the said starting material into the first of said successive zones, and maintaining the temperature within said first zone below the boiling point of tellurium, but sufficiently high to vaporize the impurities of lower boiling point and continuously conducting the vaporized impurities away from the first zone, conducting the residual unvaporized tellurium-containing material from the first into the second of such zones, maintaining in said second zone a temperature at which tellurium vaporizes, but below that at which the higher boiling point impurities are vaporized, conducting the tellurium vapor away from the unvaporized residue contained in said zone to a collecting means comprising a condenser maintained at a temperature at which tellurium condenses, and finally cooling to solidify the condensed pure tellurium.

DANIEL GARDNER.